United States Patent Office 3,428,720
Patented Feb. 18, 1969

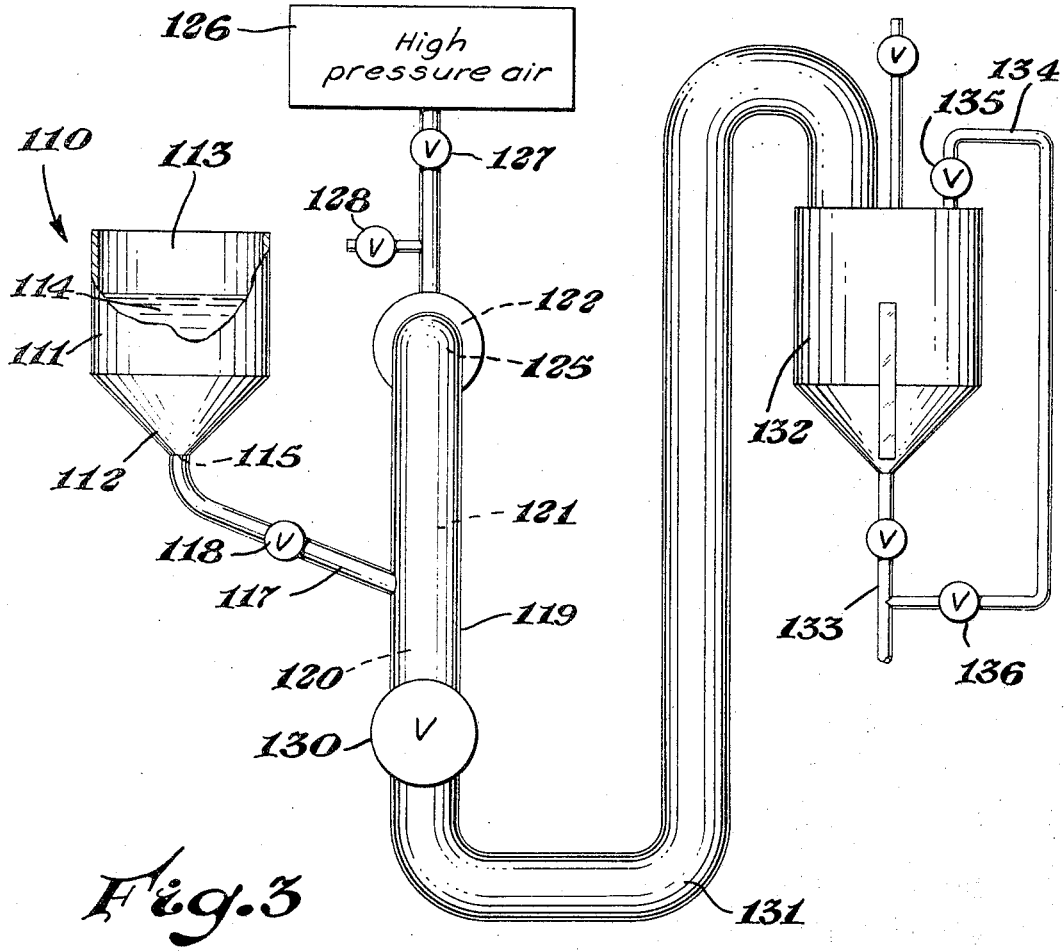
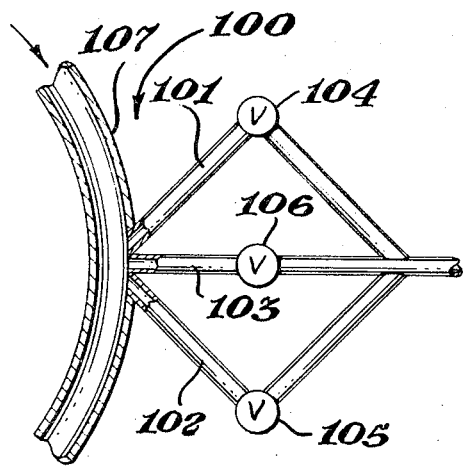

3,428,720
METHOD AND APPARATUS FOR SUPERATMOSPHERIC PREFOAMING OF EXPANDABLE SYNTHETIC RESINOUS PARTICLES
Keith R. Denslow, Midland, Mich., assignor to The Dow Chemical Company, Midland, Mich., a corporation of Delaware
Filed Sept. 28, 1966, Ser. No. 582,671
U.S. Cl. 264—51       14 Claims
Int. Cl. B29h 7/00

This invention relates to an improved method and apparatus for the superatmospheric foaming of expandable synthetic resinous materials, and more particularly relates to apparatus and a method for the continuous prefoaming of particulate expandable synthetic resinous particles under superatmospheric pressure.

A variety of methods and devices have been employed for the pre-expansion of polystyrene foamable beads, that is, particulate polystyrene containing a volatile fluid foaming agent. Such beads are frequently pre-expanded prior to molding by the use of hot air or steam at atmospheric pressure. Other styrene-like particulate expandable resins are prepared which oftentimes require higher temperatures for pre-expansion prior to molding into a unitary body. Such pre-expansion can be accomplished employing an autoclave or pressure vessel which results in a batch type operation which is often inconvenient and does not permit a convenient supply of the freshly pre-expanded beads for molding. Typical of the styrene-type resins which require pre-expansion at temperatures of about 100° C. are poly-o-chlorostyrene containing a blowing agent such as neopentane.

It would be highly desirable if there were available a method and apparatus which would permit the pre-expansion or prefoaming of particulate synthetic resinous material under superatmospheric pressure in a continuous manner.

It would also be desirable if there were available a method and apparatus for the pre-expansion of expandable synthetic resinous articles whereby the processing conditions can be readily varied.

It would also be desirable if there were available a method and apparatus capable of the superatmospheric prefoaming of synthetic resinous materials which would operate in a continuous manner and did not require a discharge valve.

These benefits and other advantages in accordance with the present invention are achieved in an apparatus which comprises in cooperative combination an elongated tubular body having a first or inlet end and a second or discharge end, a steam source in operative communication with the first end, a particle supply means in operative communication with the first end, means to control a flow of steam to the first end of the tubular body, means to control the flow of expandable particles to the first end of the tubular body, a constricting means in operative association with the second or discharge end of the tubular body and means to introduce steam into the tubular body disposed between the first end and the second end.

Also contemplated within the scope of the present invention is a method for the prefoaming of synthetic resinous particles under superatmospheric pressure comprising continuously introducing a suspension of unexpanded expandable particulate synthetic resinous material into an elongate restraining configuration, introducing steam at superatmospheric pressure into the elongate configuration, passing the expandable synthetic resinous particles and steam through the elongate configuration under superatmospheric pressure to thereby at least partially expand the expandable particles, discharging in a continuous manner the expandable particles and steam from the elongate tubular configuration.

Further features and advantages of the present invention will become more apparent from the following specification when taken in connection with the drawing wherein:

FIGURE 2 is a detail of the apparatus of FIGURE 1.

FIGURE 3 is an alternate means of providing particulate expandable material to a prefoamer in accordance with the present invention.

Figure 1:
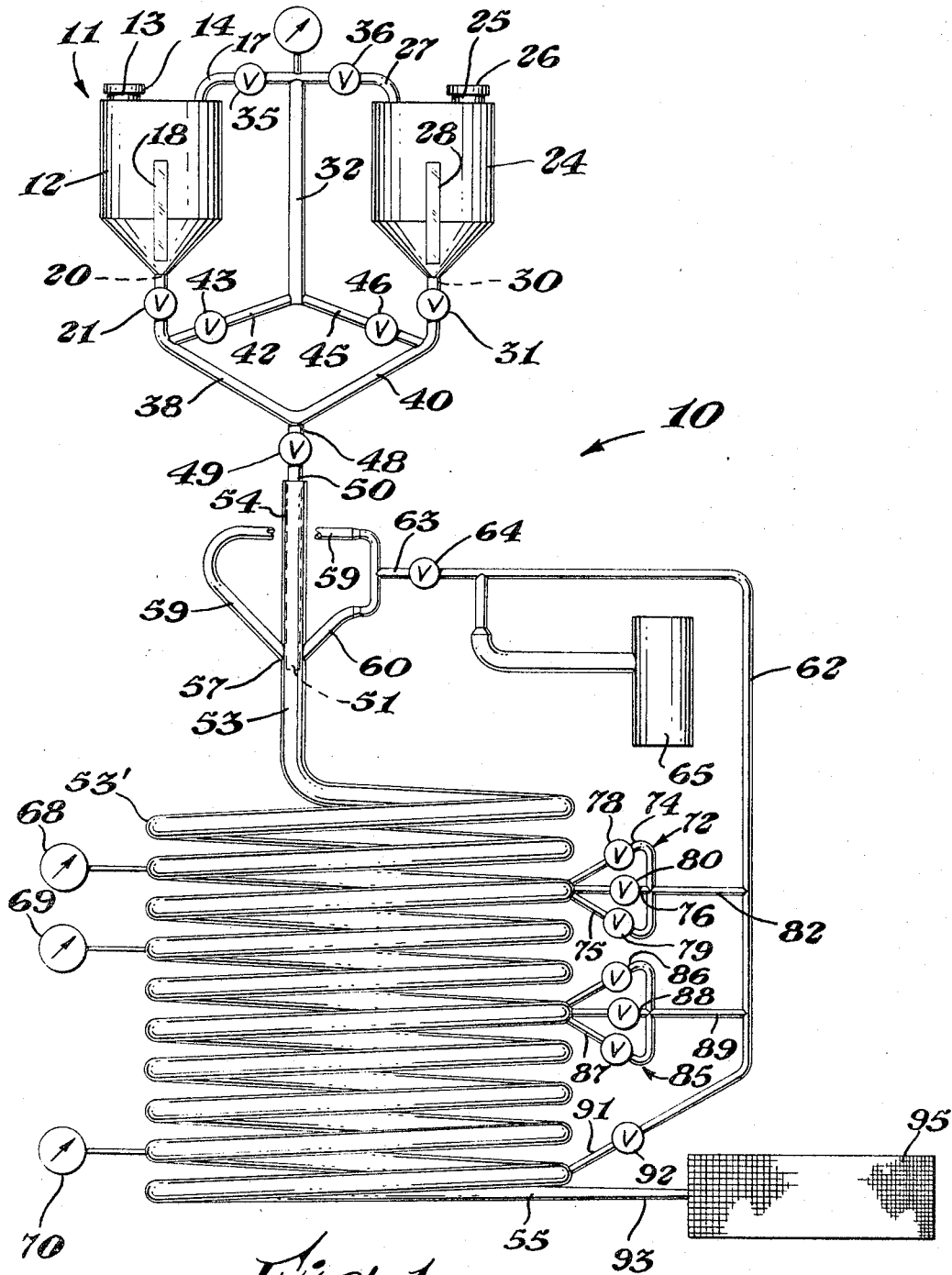
FIGURE 1 is a schematic illustration of a prefoaming apparatus in accordance with the invention.

In FIGURE 1 there is schematically depicted an apparatus in accordance with the present invention generally designated by the reference numeral 10. The apparatus 10 comprises in cooperative combination a particle supply means generally designated by the reference numeral 11. The particle supply means 11 comprises a first feed vessel or container 12. The vessel 12 has a generally upwardly facing opening 13 being sealed by a closure 14. An inlet conduit 17 is in operative communication with the interior of the vessel 12. A sight glass 18 provides a means to determine the level of the contents within the vessel 12. The vessel 12 defines a discharge opening 20 adjacent the lower portion thereof which is in operative communication with the discharge valve 21. A generally similar vessel 24 is disposed adjacent the vessel 12. The vessel 24 defines an upper or loading opening 25 having a closure 26. A conduit 27 disposed adjacent the upper portion of the vessel 24 is in operative communication with the interior thereof. A contents level indicating means or sight glass 28 is disposed within the wall of the vessel 24. The vessel 24 has a discharge opening 30 which is in operative communication with the control valve 31. A water supply header 32 is disposed adjacent the vessels 12 and 24. The header 32 is in communication with the vesels 12 and 24 by means of the conduits 17 and 27. The conduits 17 and 27 have disposed therein valves 35 and 36, respectively. A discharge conduit 38 is in operative communication with the discharge side of the valve 21 remote from the vessel 12. A discharge conduit 40 is in operative communication with the discharge side of the valve 31 remote from the vessel 24. The header 32 is in communication with the discharge conduit 38 by means of the conduit 42 having disposed therein a valve 43. The header 32 is in communication with the discharge conduit 40 by means of the conduit 45 having a valve 46 disposed therein. The conduits 38 and 40 remote from the valves 21 and 32 have a common termination at the conduit 48. The conduit 48 has disposed therein a valve 49. The conduit 48 has a first or inlet end 50 and a discharge end 51. An elongate tubular body or hollow conduit 53 having a first or inlet end 54 and a second or discharge end 55 is disposed adjacent the second end 51 of the conduit 48. The first end 54 of the conduit 53 is coaxially disposed about the second end 51 of the conduit 49 and is in sealing engagement therewith. The second end 54 of the conduit 53 defines a restriction 57 adjacent the second end 51 of the conduit 48. Adjacent the first end 54 of the conduit 53 are disposed first and second steam inlets 59 and 60. The steam inlets 59 and 60 have the form of conduits which are angularly disposed relative to the axes of the conduits 53 and 48 and are directed toward the discharge end 55 of the conduit 53. The inlet conduits 59 and 60 are in communication with a steam header 62 by means of a conduit 63 having a valve 64 disposed therein. The header 62 is in operative communication with a steam source 65. The conduit 53 conveniently forms a convoluted or helical or coiled portion 53'. First, second and third pressure indicating means or gauges 68, 69 and 79 are in operative communication with various portions of the convoluted section 53'. A second steam injecting means 72 is in operameas or gauges 68, 69 and 70 are in operative comsection 53' of conduit 53 downstream of the first pressure indicating means 68. A second steam injecting means 72 comprises a first branch or discharge conduit 74 which is directed downstream relative to flow within the conduit 53, a second branch 75 directed upstream and a third branch 76 directed radially into the conduit 53. The branches 74, 75 and 76 have disposed therein valves 78, 79 and 80, respectively. A conduit 82 provides communication between the steam header 62 and the second steam injecting means 72. A third steam injecting means 85 is disposed downstream from the second steam injecting means and downstream from the second pressure indicating means 69. The third steam injecting means is substantially similar in construction to the second steam injecting means and comprises a first downstream injection conduit 86 and a valved upstream injecting conduit 87 and a radial injecting conduit 88. The third steam injection means 85 is in operative communication with the header 62 by means of the conduit 89. A fourth steam injecting means 91 is disposed adjacent the second end 55 of the conduit 53 and downstream from the third pressure indicating means 70. The injecting means 91 is a conduit directed upstream, that is, toward the first end 54 of the conduit 53. A valve 92 provides communication between the fourth injecting means 91 and the header 62. A flow restricting region 93 is disposed at the second end 55 of the conduit 53 and reduces the diameter of the conduit in a tapering manner.

Beneficially, such a section is readily prepared from a plurality of nipples and reducers. Beneficially, the receiver 95 is formed of a wire mesh having openings sufficiently small to retain the partially expanded beads and to permit escape of steam and water.

In FIGURE 2 there is depicted a schematic sectional representation of a steam injecting means generally designated by the reference numeral 100. The means 100 comprises a downstream injecting conduit 101, an upstream injecting conduit 102, a radially injecting conduit 103 whose steam flow is controlled by the valves 104, 105 and 106, respectively. The conduits 101, 102 and 103 enter and pass through a wall 107 of an elongate conduit such as the conduit 53 of FIGURE 1. Flow direction of particles and steam within the conduit are designated by the arrow.

In operation of the apparatus as depicted in FIGURE 1, a quantity of expandable synthetic resinous thermoplastic material is placed within a feed tank such as the vessel 12. A desired quantity of hot water under pressure is added to the vessel after the closure 14 is in place by opening the valve 35. When a desired quantity of water has been added, the valve 35 is closed. Steam is provided from the source 65 to the header 62. The valve 64 is opened to provide a desired quantity of steam flowing into the first end 54 of the conduit 53. The valve 21 is opened and adjusted to provide a desired quantity of a slurry of the particulate expandable synthetic resinous material in water. The valve 49 is opened to permit the slurry of particulate material in water to flow through the conduit 48, and into the conduit 53. The second, third and fourth steam injecting means are adjusted to give the desired degree of prefoaming. If the resinous material requires a relatively high temperature and long residence times, the valves 78 and 80 are closed and the valve 79 is opened to provide steam flowing countercurrent to the direction of flow in the conduit 53. If additional retardation and higher pressures are required, the valve and conduit 87 are opened as is the valve 91.

By employing a choice of upstream, downstream or radial injection such as in the second and third stream injecting means as well as the upstream, a wide variety of conditions can readily be provided to provide optimum foaming of the particulate synthetic resinous material.

As the first vessel 12 is discharging through the valve 21, the second vessel 24 is refilled with particulate expandable resinous thermoplastic particles and water added by the means of the valve 36. When the vessel 12 is empty, the valve 31 is opened, the valve 21 closed and the filling procedure repeated for the vessel 12. Thus, a continuous flow of expandable particulate material is provided.

Beneficially, the header 32, the conduit 42, the valve 43, the conduit 45 and the valve 46 provide water under pressure to the conduit 53, if desired. If plugging occurs or alternately by closing the valve 49, the vessels 12 or 14 may be back-flushed, whereas if bridging occurs, water under pressure with reverse flow will dislodge the offending particles.

In FIGURE 3 there is depicted an alternate feed arrangement particularly suited for heating particulate resinous particles employing the expanding apparatus in accordance with the invention. The feed arrangement is generally designated by the reference numeral 110 and comprises in cooperative combination an open tank 111 having a bottom 112 and an opening at the top 113. The tank 111 contains a slurry 114 of water and expandible synthetic resinous thermoplastic material. The tank 111 has a bottom discharge opening 115 in cooperative combination with a conduit 117 having a valve 118 disposed therein. The conduit 117 remote from the vessel or tank 111 is in operative communication with a housing 119. The housing 119 defines an internal cavity 120. The internal cavity 120 is divided into a bead receiving portion 121 and pressurized fluid receiving portion 122 separated from each other by a flexible diaphragm 125. The portion 122 is in operative communication with a source 126 of fluid under pressure by means of a valve 127. A discharge valve 128 is also in operative communication with the fluid receiving portion 122. A valve 130 is in operative communication with the bead receiving portion 121 of the chamber 120. The valve 130 is adapted to selectively discharge from the chamber 120 into a conduit 131 which is in operative communication with a feed tank or vessel 132 which is operatively connected to a prefoaming apparatus which may be operatively connected to a conduit such as the conduit 48 of the apparatus of FIGURE 1 by means of the discharge conduit 133. The vessel 132 has a pressurized water header 134 which communicates with the vessel by means of the valve 135 or alternately with the conduit 133 by means of the valve 136.

In operation of the embodiment depicted in FIGURE 3, beads and water are placed in the vessel 111, the valves 127 and 130 are closed, the valves 118 and 128 are opened, the hydrostatic head of the slurry 114 forces a mixture of particles and water into the chamber portion 121 forcing the diaphragm 125 into the chamber portion 122. The valves 118 and 128 are closed. The valve 127 is opened and the valve 130 is opened. Fluid under pressure from the source 126 forces the diaphragm toward the valve 130 causing the slurry to be forced through the conduit 131 into the feed tank 132 where it is discharged at a continuous rate from the bottom thereof.

As hereinbefore set forth, the particular operating conditions depend primarily upon the type and nature of the expandable particles employed. Due to continuous flow employed in the apparatus, optimum conditions are rapidly achieved utilizing relatively small quantities of material, thus substantially and significantly reducing waste usually generated in a batch prefoaming method if improper conditions are selected due to normal batch to batch variation of the expandable particulate resinous material.

By way of further illustration, an apparatus generally as illustrated in FIGURE 1 is constructed wherein the conduit 53 is 57 feet of nominal 1 inch stainless steel pipe formed into a helix having about a 21 inch diameter and 10 turns. All steam lines and valves are nominally ½ inch. The valves such as the valves 21, 31 and 49 are ball valves, while the remaining valves are globe valves. A plurality of particles of poly-o-chlorostyrene containging about 7 weight percent neopentane are placed under water having a temperature of 87° C. and a pressure of 80 pounds per square inch. The steam header 62 is supplied with 150 pounds of steam and the pressure within the helical coil maintained uniformly at a pressure of 40 pounds per square inch. Excellent moldable prefoamed poly-o-chlorostyrene beads are obtained.

Further experiments employing a variety of batches of poly-o-chlorostyrene having slightly different foaming characteristics indicated that the apparatus is readily and quickly adjustable to provide the pre-expanded beads of optimum quality.

In a manner similar to the foregoing illustration, expandable particles of polytertiary butyl styrene, polymethyl methacrylate, copolymers of 70 percent styrene, 30 percent acrylonitrile and the like are readily expanded to provide desired molding characteristics.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the prefoaming of synthetic resinous particles under superatmospheric pressure, the steps of the method comprising
   continuously introducing the suspension of an unexpanded expandable particulate synthetic resinous material into an elongate restricting configuration,
   introducing steam at superatmospheric pressure into the elongate configuration,
   passing the expandable synthetic resinous particles and steam through the elongate configuration under superatmospheric pressure to thereby at least partially expand the expandable particles, and
   discharging in a continuous manner the expandable particles and steam from the elongate tubular configuration.

2. The method of claim 6 including the step of introducing steam into the elongate restraining configuration at a point between the introduction of steam and particles and the discharge of the steam and particles.

3. The method of claim 2 wherein the steam introduced is introduced countercurrent to the flow of steam and particles.

4. The method of claim 1 wherein the synthetic resinous particles comprise poly-o-chlorostyrene containing a volatile fluid foaming agent.

5. The method of claim 2 wherein a plurality of streams of steam are introduced into the elongate restraining configuration and the streams are in spaced relationship to each other.

6. An apparatus for the pre-expansion of synthetic resinous thermoplastic particles, the apparatus comprising in cooperative combination
   an elongated tubular body having an inlet end and a discharge end,
   a steam source in operative communication with the inlet end,
   means to supply expandable synthetic resinous particles in operative communication with the inlet end,
   means to control the flow of steam from the steam source to the inlet end of the tubular body,
   means to control the flow of expandable particles to the inlet end of the tubular body,
   a constricting means in operative association with the discharge end of the tubular body, and
   means to introduce steam into the tubular body disposed between the inlet end and the outlet end.

7. The apparatus of claim 1 wherein the particle supply means comprises first and second sources of expandable particulate resinous material and means to selectively connect the sources to the inlet end of the body.

8. The apparatus of claim 6 wherein the steam source in operative communication with the inlet end of the body is connected with inlet means adapted to direct steam toward the outlet end of the body.

9. The apparatus of claim 6 wherein the means to introduce steam into a tubular body from the inlet end and the discharge end comprises means to selectively introduce the steam in the direction of the upstream and the downstream end and radially.

10. The apparatus of claim 6 wherein a plurality of means to introduce steam are disposed between the inlet end and the outlet end of the tubular body.

11. The apparatus of claim 6 wherein the tubular body has a generally helical configuration.

12. The apparatus of claim 6 including a receiver in cooperative combination with the second end to receive the particulate particles.

13. The apparatus of claim 12 wherein the receiver is of mesh construction.

14. The apparatus of claim 6 wherein the synthetic resinous thermoplastic supply means comprises
   an open particle receiving tank having a valved bottom discharge, the valved bottom discharge in communication with a housing defining an internal cavity, the internal cavity divided into a bead receiving portion and a fluid receiving portion separated from each other by a flexible diaphragm, and
   means to increase and decrease the volume of the bead receiving portion, the valve in communication with the bead receiving portion, the feed tank in operative communication with said valve, the feed tank being operatively connected to the inlet end of the tubular body.

References Cited

UNITED STATES PATENTS

| | | |
|---|---|---|
| 1,392,656 | 10/1921 | Rew. |
| 1,917,467 | 7/1933 | Soderlund. |
| 2,306,462 | 12/1942 | Moorman. |
| 2,819,890 | 1/1958 | Rosa et al. |
| 3,155,379 | 11/1964 | Fischer et al. |
| 3,162,704 | 12/1964 | Attanasio et al. _____ 264—53 |

OTHER REFERENCES

Franson, G. R., "Fabrication Methods For Expandable Polystyrene," in Plastics Technology, July 1956, pp. 452–455.

JULIUS FROME, *Primary Examiner.*

PHILIP E. ANDERSON, *Assistant Examiner.*

U.S. Cl. X.R.

18—5; 263—21; 34—57; 264—345

UNITED STATES PATENT OFFICE
CERTIFICATE OF CORRECTION

Patent No. 3,428,720                                         February 18, 1969

Keith R. Denslow

It is certified that error appears in the above identified patent and that said Letters Patent are hereby corrected as shown below:

Column 2, line 72, "79" should read -- 70 --. Column 3, line 3, cancel "meas or gauges 68, 69 and 70 are in operative com-" and insert -- tive communication with a portion of the convoluted --. Column 4, line 4, before "resinous" insert -- synthetic --. Column 6, line 10, the claim reference numeral "1" should read -- 6 --.

Signed and sealed this 31st day of March 1970.

(SEAL)
Attest:

Edward M. Fletcher, Jr.                          WILLIAM E. SCHUYLER, JR
Attesting Officer                                   Commissioner of Patents